Patented Aug. 12, 1947

2,425,569

UNITED STATES PATENT OFFICE 2,425,569

HYDROFLUORIC SALTS OF BASIC TRIARYLMETHANE DYESTUFFS

Arthur E. Schaefer, Loudonville, N. Y., assignor to General Aniline & Film Corporation, New York, N. Y., a corporation of Delaware No Drawing. Application July 2, 1946, Serial No. 681,134

8 Claims. (Cl. 260—388)

This invention relates to an improvement in basic triarylmethane dyestuffs and is particularly concerned with hydrofluoric acid salts of basic triarylmethane dyestuffs in which at least one of the amino groups contains at least one alkyl or aryl substituent.

Triarylmethane dyestuffs are commonly isolated in the form of their hydrochloric acid salt. However, in the case of triarylmethane dyestuffs which in one or more of the amino groups contain an alkyl or aryl substituent, the hydrochloride is only moderately soluble in water and is thus unsuited for use in applications, particularly in beater dyeings of paper where good water solubility is desirable. Consequently, it has heretofore been proposed that for use in applications where water solubility is important, such basic triarylmethane dyestuffs be isolated in the form of various other salts which have a greater water solubility than the corresponding hydrochloride. While various salts are known, such as the phosphoric acid salts of basic triarylmethane dyestuffs which have been described, for instance, in U. S. Patent No. 1,978,755 which are satisfactorily soluble in water for use in beater dyeings, for example, in general such water-soluble salts are relatively insoluble in lower aliphatic alcohols such as ethanol, methanol, propanol and the like, and therefore are not satisfactory for use in applications where spirit solubility is important—for instance, in the lake trade.

I have discovered that if basic triarylmethane dyestuffs, which in one or more of the amino groups contain at least one alkyl or aryl substituent, are isolated in the form of their hydrofluoric acid salt, the thus-obtained salt not only is satisfactorily soluble in water, but in addition is satisfactorily soluble in alcohol. Since these hydrofluoric acid salts of basic triarylmethane dyestuffs can be readily obtained, it is apparent that they offer important commercial advantages since they provide a single material which can be employed in applications where either water or alcohol solubility is important.

The triarylmethane dyestuffs whose hydrofluoric acid salts are included in the present invention may be exemplified by the diamino and triamino triarylmethane dyestuffs in which at least one of the amino groups contains an alkyl or aryl substituent and may be exemplified by the following general formula:

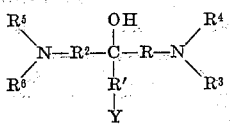

in which R, R' and R² represent aryl groups, R³ represents an alkyl or aryl group and R⁴, R⁵ and R⁶ may be hydrogen or an alkyl or aryl group and Y stands for hydrogen or an amino group, i. e., the group

in which R⁷ and R⁸ stand for a member of the group consisting of hydrogen and alkyl and aryl groups. In general, I have found that the more complicated the triarymethane molecule, i. e., the greater the number of substituents in the amine groups, the greater the difference in the water solubility of the hydrofluorides as compared with the hydrochlorides, the hydrofluorides becoming increasingly more soluble in contrast to the hydrochlorides as the dyestuff molecule becomes more complex. In the case of pararosaniline, an unsubstituted basic triarylmethane dyestuff, the hydrofluoride and hydrochloride thereof possess substantially the same water solubilities and the hydrofluorides of such unsubstituted basic triarylmethane dyestuffs are therefore excluded from the scope of the present invention. However, there is a marked difference in relative solubility of the hydrochloride and hydrofluoride of dyestuffs containing relatively simple substituents in the amino groups, and this difference in solubility becomes even greater with further increases in the degree of substitution of the amine groups in the molecule of the dyestuff.

The hydrofluoric acid salts of dyestuffs of this character may conveniently be prepared by treating the dyestuff (carbinol) base in the form of an aqueous paste or a solution in an inert organic solvent, such as the lower aliphatic alcohol—for instance, methanol, ethanol, isopropanol and the like, with a sufficient amount of hydrofluoric acid to convert the dyestuff base into its hydrofluoride. In general, I prefer to employ approximately 1 mol of hydrofluoric acid for each mol of base, so that the mono-hydrofluoric acid salt of the basic triarylmethane dyestuff is the principal product formed. However, it will be apparent that in the case of many basic triarylmethane dyestuffs, more than 1 mol of hydrofluoric acid can be added to each mol of dyestuff base so as to form the di- or trihydrofluoric acid salt of the dyestuff. Since such di- and trihydrofluoric acid salts of dyestuffs exhibit solubilities comparable to those of the mono-hydrofluoric acid salts, they are therefore not excluded from the scope of the present invention. In particular, the presence of minor amounts of the di- or trihydrofluoric acid salts of the basic triarylmethane dyestuffs in admixture with a major portion of mono-hydrofluoric acid salt thereof is not objectionable. I have found that satisfactory products are obtained by adding hydrofluoric acid to a dyestuff base until a 2-gram sample dissolved in 100 cc. of distilled water has a pH of between 2.8 and 3.2. In order to complete the conversion of a dyestuff base to its hydrofluoric acid salt, the reaction mixture may be warmed, if desired, to a temperature of from 50° C. to 60° C. or slightly higher. At this temperature range, the conversion is complete within 15 to 20 minutes. The hydrofluoric acid salts of the basic triarylmethane dyestuffs may readily be isolated by drying the reaction mixture and the dried salt may then be ground to the desired fineness.

The following specific examples illustrate various specific embodiments of the present invention:

Example I

Weigh into a nickel beaker 24.4 grams (0.05 mol) of Victoria Blue B (C. I. 729) base as a 12% aqueous paste. Add under agitation 3 cc. of 52% hydrofluoric acid (0.078 mol). The solution is warmed at 50° for 15 to 20 minutes to complete conversion. A 2-gram sample of the solution when dissolved in 100 cc. of distilled water had a pH of 3.2. The hydrofluoric acid salt is dried on a drum dryer or in some similar manner. The dry powder is then ground to desired fineness. An analysis showed 4.83% fluorine. Theory= 3.88% fluorine (calculated on the basis of the monofluoride).

Example II

Into a nickel beaker weigh 400 grams of Victoria Blue B (C. I. 729) base as an aqueous paste containing about 48 grams 100% base. Add under agitation 13 cc. of 52% hydrofluoric acid solution. The solution is warmed at 50° for 15 to 20 minutes to complete conversion. A 2-gram sample dissolved in 100 cc. of distilled water had a pH of 2.8. The hydrofluoric acid salt is dried on a drum dryer or in some similar manner. The dry powder is then ground to desired fineness. An analysis showed 8.8% fluorine.

Example III

Into a nickel beaker weigh 35 grams (.072 mol) of dry Victoria Blue B (C. I. 729) base. Add 35 cc. isopropanol. Mix well and then add with mixing about 7 cc. of a 52% hydrofluoric acid solution (0.18 mol). Warm with mixing to 35–40° C. and adjust if necessary with more hydrofluoric acid so that a 2-gram sample dissolved in 100 cc. of distilled water has a pH of 2.8 to 3.1. Dry on a steam bath or by some similar method. Grind as in Example I.

Example IV

Into a nickel beaker weigh 46.7 grams 100% (0.106 mol) Victoria Blue R (C. I. 728) base as an aqueous paste containing 23% solids. Add under agitation 4.5 cc. of 52% hydrofluoric acid solution (0.115 mol). The solution is warmed to 60° under agitation for 15 to 20 minutes to complete conversion. A 2-gram sample dissolved in water has a pH of 3.8. The hydrofluoric acid salt is dried on a drum dryer or by some similar means and then ground to desired fineness. An analysis showed 4.82% fluorine; theory=4.30% fluorine.

The above experiment was repeated using twice the amount of hydrofluoric acid and completed as in Example IV. An analysis showed 9.3% fluorine.

Example V

Weigh into a nickel beaker 100 grams of an aqueous paste of Victoria Blue R (C. I. 728) base. Add under agitation 6 cc. of 52% hydrofluoric acid. The solution is warmed at 60° under agitation for 15 to 20 minutes to completely convert the base. A 2-gram sample in 100 cc. water had a pH of 3.1. The hydrofluoric acid salt is dried and ground as in Example I. An analysis showed 7.35% fluorine.

Example VI

Into a nickel beaker weigh 13 grams (0.029 mols) of Victoria Blue R base and mix in 30 cc. of isopropanol. Add with mixing about 5–6 cc. of a 52% solution of hydrofluoric acid or sufficient so that a 2-gram sample of the solution when dissolved in 100 cc. of water has a pH of 2.8 to 3.1. The product is dried in the usual manner and the dry powder prepared for use in dyeing by grinding through a 100 mesh screen.

Example VII

Into a nickel beaker weigh 40 grams of dry Crystal Violet APX (C. I. 681) base and add 30 cc. of isopropanol. Mix well and add with mixing about 7 cc. of a 52% solution of hydrofluoric acid. Warm with mixing to 35–40° C. and adjust if necessary with more hydrofluoric acid so that a sample treated as in Example I has a pH of 2.8 to 3.1. Dry on a steam bath or by some similar method. Grind as in Example I.

Example VIII

Weigh into a nickel beaker 100 grams of Victoria Pure Blue BGO base, listed as Prototype 198 in AATCC year book 1945 prepared from Michler's ethyl ketone and ethyl α-naphthylamine, as an aqueous paste containing 0.043 mol base. Add 6 cc. of 52% hydrofluoric acid and agitate at 50° for about 15 minutes. A 2-gram sample of the solution when dissolved in 100 cc. of distilled water had a pH of 3.1. Dry in the usual manner and grind the dry powder as in Example I.

Example IX

Weigh into a nickel beaker 15 grams (0.043 mol) of Malachite Green (C. I. 657) base. Add 25 cc. of water and agitate to a smooth slurry. Add 4.2 cc. of 52% hydrofluoric acid and agitate at 50° for about 15 minutes. A 2-gram sample dissolved in 100 cc. of distilled water had a pH of 3.2. The product was dried in the usual manner and ground as in Example I.

I claim:

1. Hydrofluoric acid salts of basic triarylmethane dyestuffs of the formula:

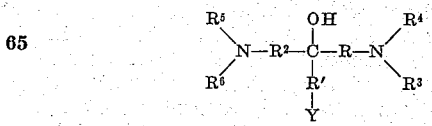

wherein R, R' and $R^2$ represent aryl groups, $R^3$ represents a member of the group consisting of alkyl and aryl groups, $R^4$, $R^5$ and $R^6$ represent a member of the group consisting of hydrogen, alkyl and aryl groups, and Y stands for a member of the group consisting of hydrogen and amino groups.

2. Hydrofluoric acid salts of basic triarylmethane dyestuffs of the formula:

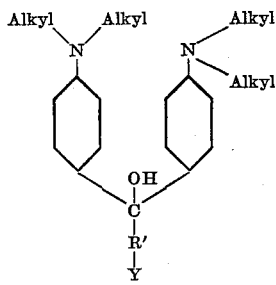

wherein R' represents an aryl group and Y represents a member of the class consisting of hydrogen and amino groups.

3. Hydrofluoric acid salts of basic triarylmethane dyestuffs of the formula:

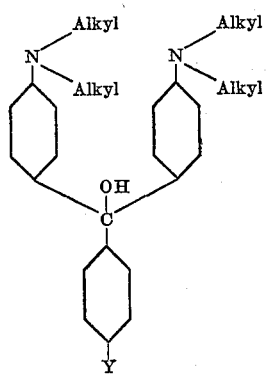

wherein Y represents a member of the class consisting of hydrogen and amino groups.

4. Hydrofluoric acid salts of basic triarylmethane dyestuffs of the formula:

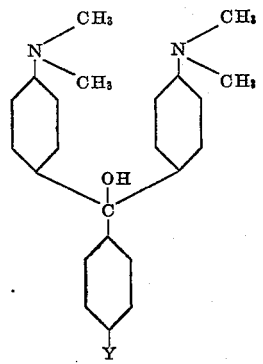

wherein Y represents a member of the class consisting of hydrogen and amino groups.

5. Hydrofluoric acid salts of basic triarylmethane dyestuffs of the formula:

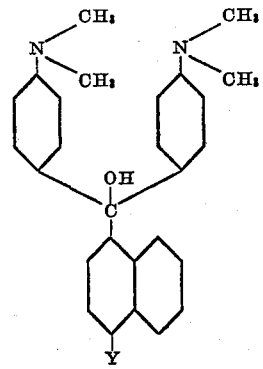

wherein Y represents a member of the class consisting of hydrogen and amino groups.

6. Hydrofluoric acid salts of the basic triarylmethane dyestuff of the formula:

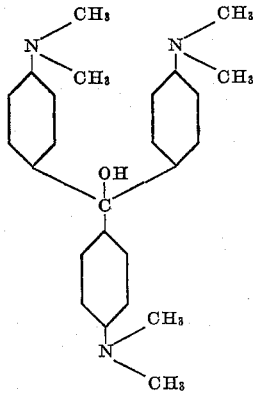

7. Hydrofluoric acid salts of the basic triarylmethane dyestuff of the formula:

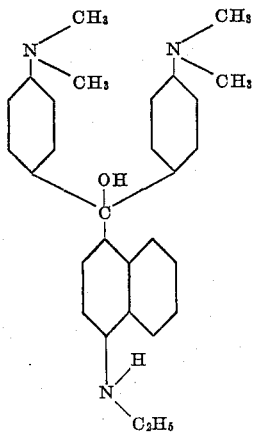

8. Hydrofluoric acid salts of the basic triarylmethane dyestuff of the formula:

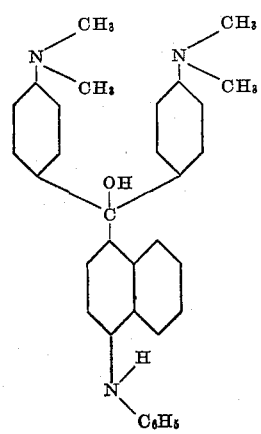

ARTHUR E. SCHAEFER.

REFERENCES CITED

The following references are of record in the file of this patent:

UNITED STATES PATENTS

| Number | Name | Date |
|---|---|---|
| 1,978,755 | Muller et al. | Oct. 30, 1934 |